Figure 1:
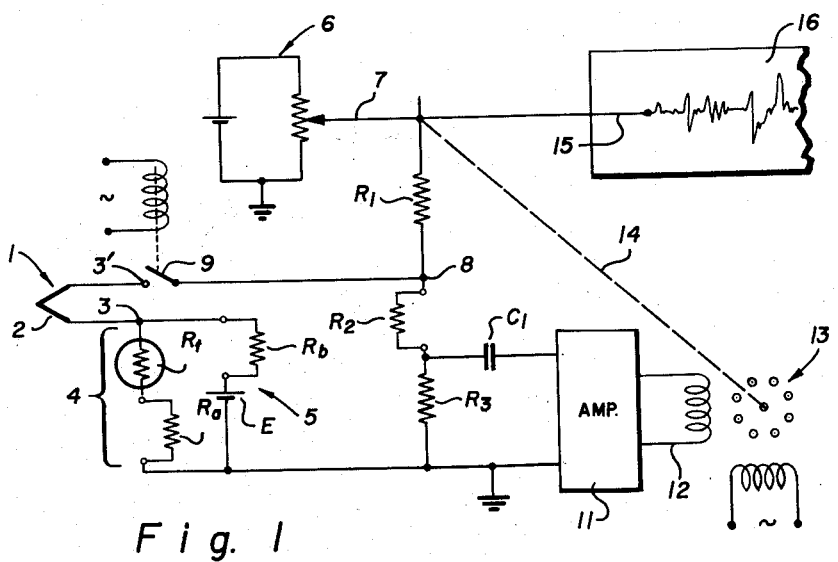

INVENTORS
Robert J. Rorden
Allen A. Ginsling by Wm J Nolan
Attorney

_United States Patent Office_

3,073,164
Patented Jan. 15, 1963

3,073,164
THERMOCOUPLE MEASURING CIRCUIT
Robert J. Rorden, Los Altos, and Allen A. Ginsling, Palo Alto, Calif., assignors to Varian Associates, Palo Alto, Calif., a corporation of California
Filed Feb. 29, 1960, Ser. No. 11,530
12 Claims. (Cl. 73—361)

The present invention relates in general to measuring circuits, and more particularly to thermocouple measuring circuits employing a temperature-sensitive impedance to compensate for changes in the temperature of the thermocouple reference junction and used, for example, in temperature responsive recorders, meters and control systems.

Since the temperature responsive voltage generated by a thermocouple is proportional to the temperature difference between the measuring junction and the reference junction, variations in the ambient temperature at the reference junction will introduce undesired voltage variations. Such variations can be effectively canceled by providing, for example, a resistance network including a resistor made from a material having a high temperature coefficient of resistance (for example, nickel, nickel alloys, copper, copper alloys, or a semiconductor), said temperature-sensitive resistor being in thermal contact with the reference junction whereby a compensating voltage is developed in response to changes in the resistance thereof with changes in the reference junction temperature. When it is desired to use such a measuring circuit for various thermocouple types and temperatures, the value of the network resistances must be changed to match the voltage-temperature characteristics of the different thermocouples and to maintain a suitable voltage reference level. In order to provide a flexible and versatile measuring instrument, it is desirable that the measuring circuit accommodate quickly insertable resistor plug-in units for each thermocouple type and temperature range. A significant problem in the design of a simple and efficient instrument of this type is presented in view of the fact that it is impractical to provide a temperature-sensitive resistor in each plug-in unit, since this resistor is a costly item which must be carefully constructed and carefully mounted in good thermal contact with the reference junction.

Accordingly, it is one object of the present invention to provide a thermocouple circuit which compensates for changes in the reference junction temperature, and which is adaptable to various thermocouple types and temperatures by the insertion of simple plug-in units containing only fixed value resistors (or other impedance elements).

A highly accurate and sensitive voltage measuring technique consists of developing an error signal corresponding to the difference between the unknown voltage and a known potentiometer measuring voltage, and adjusting the measuring voltage until there is established a balanced condition at which no error signal is detected. In a versatile measuring instrument, the same potentiometer is used to measure varying ranges of voltage, so that a wide variation exists in the maximum difference between the unknown voltage and the potentiometer measuring voltage. This presents another significant problem in that an error signal which is developed directly from the difference between the unknown and measuring voltages will vary over a wide range, thereby necessitating inconvenient and time-consuming adjustments of the recorder gain.

Accordingly, another object of the present invention is the provision of a potentiometer balancing circuit wherein the maximum unbalance error signal does not vary appreciably with changes in the input voltage range.

One feature of the present invention is the provision of a novel voltage-dividing impedance network for compensating changes in the thermocouple reference junction temperature, said network including temperature-sensitive and temperature-insensitive impedance elements and being adaptable to various thermocouple types and measuring temperatures by changes in the value of the temperature-insensitive elements only.

Another feature of the present invention is the provision of a novel attenuator circuit in series with the measuring arm of a balancing potentiometer whereby the maximum unbalance error signal is substantially independent of measuring range.

Another feature of the present invention is the provision of a novel servo damping circuit in combination with the attenuator of the preceding paragraph wherein the attenuating resistance is physically separate from the variable resistance in said damping circuit so that the resistance of said attenuator circuit is not subject to the large tolerances of commercially available variable resistances.

Another feature of the present invention is the provision of a circuit for adapting a general purpose balancing potentiometer type instrument, for example, a graphic recorder, to temperature measurement.

Figure 2:
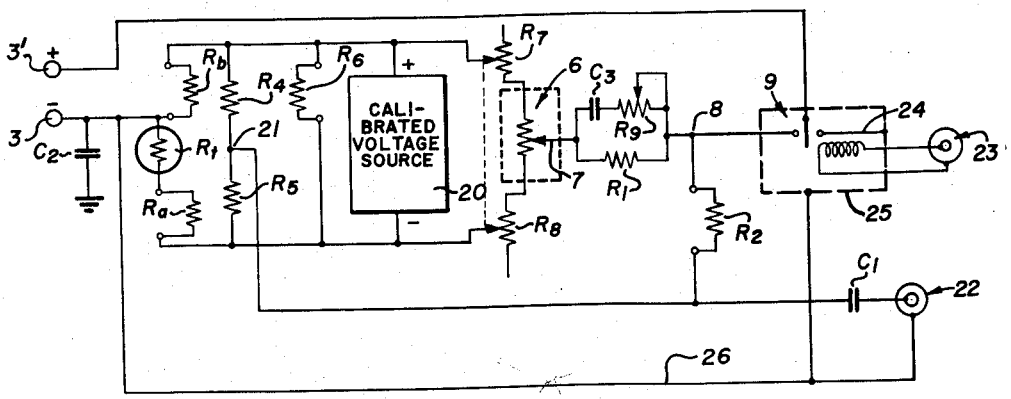

These and other features and advantages of the present invention will become apparent upon a perusal of the following specification taken in connection with the accompanying drawings wherein, FIG. 1 is a simplified schematic diagram of a thermocouple measuring circuit in accordance with the present invention, and FIG. 2 is a detailed schematic diagram of a measuring circuit in accordance with the present invention which is especially useful for adapting a general purpose voltage measuring instrument to temperature measurement.

Referring to FIG. 1, a thermocouple 1, comprising a measuring junction 2 and a reference junction at terminals 3 and 3', developes a temperature responsive voltage between said terminals. This voltage is connected in series with the voltage appearing across branch 4 of a voltage-dividing network 5, the branch voltage serving to compensate for changes in the ambient temperature of reference junction 3, 3' as will be described subsequently. A measuring voltage is picked off the balancing potentiometer 6 at arm 7, and dropped through a series of attenuating resistors $R_1$, $R_2$, and $R_3$. The resistor $R_2$ is a plug-in element whose value is selected so that the fraction of the potentiometer arm voltage appearing at junction 8 matches the voltage range of the thermocouple 1.

An A.C. voltage, conveniently at the power line frequency, actuates an interrupter or chopper 9, so that any difference appearing between the potentiometer measuring voltage developed at junction 8 and the temperature responsive voltage developed at terminal 3' causes a signal at the chopper frequency to flow through resistors $R_2$ and $R_3$. The voltage developed by this current across resistor $R_3$ is transmitted as an error signal through coupling capacitor $C_1$ to the input of amplifier 11. The output of amplifier 11 is applied to one phase winding 12 of a two phase reversible servomotor 13, the other phase winding of the motor 13 being powered by a reference signal in phase with the voltage which actuates chopper 9. Whenever an error signal appears across $R_3$, the armature of motor 13 will rotate in a direction which moves the potentiometer arm 7 (mechanically coupled thereto through a linkage 14) towards a balanced position at which the error voltage is reduced to zero.

Thus, it is seen that the arm 7 moves in variable accordance with the input signal to terminal 3', and may be used, for example, to drive a recording stylus 15 on a recording strip chart 16. This circuit arrangement could also be used to actuate an automatic control; or the position of arm 7 could be used to establish a reading on a meter or other read-out device, either automatically or by eliminating the servomotor and using manual adjustment.

Referring now in greater detail to the voltage-dividing network 5, the reference voltage E is divided across a first branch containing a fixed value resistor $R_b$, and a branch 4 in series therewith comprising a fixed value resistor $R_a$ and a temperature-sensitive resistor $R_t$. The resistor $R_t$ is permanently mounted in good thermal contact with respect to reference junction terminal 3, and resistors $R_a$ and $R_b$ are interchangeable plug-in elements.

Resistors $R_a$ and $R_b$ are chosen so that the value of the voltage $V_4$ developed across branch 4 is equal to the potentiometer voltage appearing at junction 8 when arm 7 is at a selected scale position corresponding to a reference temperature, minus the thermocouple voltage generated across terminals 3, 3', at said selected temperature. This value of $V_4$ may be expressed by the equation:

(1) $$V_4 = E \frac{R_a + R_t}{R_a + R_t + R_b}$$

Simultaneously, $R_a$ and $R_b$ are also chosen so that the variation in $V_4$ with reference junction temperature $t$ compensates for the corresponding variations in the thermocouple voltage. This requires that the slope $$\frac{dV_4}{dt}$$

of the compensating voltage-temperature curve be equal to the thermoelectric power Q (slope of the thermocouple voltage-temperature curve) at the reference junction temperature. Since $$\frac{dV_4}{dt} = \alpha \frac{dV_4}{dR_t}$$

where $$\alpha = \frac{dR_t}{dt}$$

is the temperature coefficient of resistance of resistor $R_t$, this second condition may be expressed by the equation:

(2) $$\frac{dV_4}{dR_t} = \frac{Q}{\alpha}$$

Simultaneous solution of Equations 1 and 2 yields the following explicit values for $R_a$ and $R_b$:

(3) $$R_a = (E - V_4) \frac{V_4}{E} \cdot \frac{\alpha}{Q} - R_t$$

(4) $$R_b = \frac{(E - V_4)^2}{E} \cdot \frac{\alpha}{Q}$$

Thus a plug-in unit containing only fixed value resistors determined by Equations 3 and 4 adapts the circuit to each thermocouple type and reference temperature. It should be noted that the temperature sensitive branch of the voltage dividing network may comprise a fixed value resistor which is connected in parallel, rather than in series, with the temperature-sensitive resistor $R_t$, and the values of the network components chosen by deriving equations similar to Equations 3 and 4. Also, in FIG. 1, the temperature coefficient α of resistor $R_t$ is taken to be positive. If the temperature-sensitive resistor is made from a material having a negative temperature coefficient of resistance, it would be located in the branch with $R_b$.

Also included in each plug-in unit is a range resistor $R_2$ chosen so that the span of measuring voltages appearing at junction 8 as the potentiometer arm 7 moves from the minimum to the maximum position corresponds with the range of input voltage variation. Since this range resistor determines the maximum unbalance signal appearing at junction 8, the amplifier input could not be taken at this point unless the gain were adjusted with each change in the measuring voltage range. However, in accordance with the present invention, the voltage at the potentiometer arm 7 is dropped through an attenuating branch of series resistances $R_1$, $R_2$ and $R_3$. The value of $R_1$ is chosen to be large compared to the sum of $R_2$ and $R_3$, so that the current in said branch is essentially determined by $R_1$ and does not vary appreciably with changes in the range resistor $R_2$. Thus the input voltage of amplifier 11, which is taken across $R_3$ only, is substantially independent of range, and the need for a gain adjustment is eliminated.

The circuit of FIG. 2 is an elaboration of the circuit of FIG. 1 used to adapt a general purpose voltage measuring instrument, containing a balancing potentiometer 6, to temperature measurement. In one embodiment the measuring instrument is a graphic recorder of the type shown in FIG. 1 having the balancing potentiometer 6 mounted in the servomotor chassis thereof; the circuit of FIG. 2 is mounted on an input chassis which is readily interchangeable with a chassis containing a general purpose circuit, for example, of the type shown in the copending U.S. application of Mike E. Simonton, Ser. No. 689,939, filed October 14, 1957, now Patent No. 2,996,670; and the temperature-sensitive resistor $R_t$ consists of thinly coated nickel alloy wire wound on an internally threaded brass bobbin which mates to form a good thermal contact with a threaded extension of a thermocouple terminal post forming the reference junction terminal 3', the average temperature of the reference junction being about 30° C.

A single calibrated stable voltage source 20, such as a diode regulated power supply or a mercury cell, provides all necessary reference voltages. Since the minimum scale position of the potentiometer arm 7 is characteristic of the particular measuring instrument used, the minimum temperature voltage for each thermocouple type and range must be matched to that position. This is accomplished by connecting resistors $R_4$ and $R_5$ across the voltage source 20 so that the open circuit voltage at junction 21 therebetween is equal to the measuring voltage of potentiometer arm 7 at this minimum scale position. Simultaneously, $R_4$ and $R_5$ are chosen so that the effective series resistance $$R_3 = \frac{R_4 R_5}{R_4 + R_5}$$

is small compared to the current determining resistor $R_1$, as discussed with reference to FIG. 1. Since the voltage of arm 7 when it is in the minimum position is equal to the open circuit voltage at junction 21, no current flows through resistor $R_1$, and the voltage at junction 8 is the same as that at arm 7. Finally the voltage $V_4$ of thermocouple junction terminal 3 is chosen so that when it adds to the thermocouple voltage generated across terminals 3 and 3' at the minimum temperature, the voltage at terminal 3' will also be equal to the minimum arm voltage, and the condition of balance for minimum temperature is established at the minimum scale position.

The interrupting signal is applied through plug 23 of a conventional chopper 9, one terminal 24 of which is left open-circuited and the casing 25 of which is connected to line 26 for purposes of electrostatic shielding. Capacitor $C_2$ provides a bypass path for filtering out unwanted A.C. signals, such as the line frequency hum to which a servomotor of the type shown in FIG. 1 would readily respond.

A current standardizing resistor $R_6$ is included in each plug-in unit so that the combined impedance due to $R_a$, $R_b$ and $R_6$ remains constant for all thermocouple types and ranges. This prevents changes in the voltage drop across the internal impedance of the voltage source 20. A fine zero adjustment is provided by ganged variable resistors $R_7$ and $R_8$ which vary differentially so that the total series resistance of the branch containing potentiometer 6 and resistors $R_7$ and $R_8$ also remains constant.

In the event that a servomotor is used to balance the potentiometer 6, a lead network comprising a capacitor $C_3$ in series with a variable resistor $R_9$ is connected in parallel with the attenuator resistor $R_1$. This network, which is of the type described and claimed in the aforementioned copending U.S. application of Mike E. Simonton, applies a braking voltage to junction 8 which is proportional to the rate at which the potentiometer arm 7 is moving, thereby damping the servomotor and preventing signal hunting. The resistor $R_9$ is used to vary the damping characteristics without varying the magnitude of the D.C. resistance of the attenuating branch. The circuit of FIG. 2 has the further advantage that the attenuating resistor $R_1$ is a fixed value resistor which is physically separate from the variable resistor $R_9$. Since fixed value resistors are commercially available at closer tolerances than are variable resistors, this arrangement avoids large variations in the resistance of the attenuator circuit thereby permitting the use of standardized plug-in resistors.

In operation, a plug-in unit comprising a set of resistors $R_a$, $R_b$, $R_2$ and $R_6$ whose values are chosen for a given thermocouple type and temperature range is inserted in the adapting circuit. A reference signal corresponding to the thermocouple voltage at or near the minimum temperature of the range is applied at terminals 3, 3' and the zero position resistors $R_7$ and $R_8$ are adjusted until the position of the potentiometer arm 7 exactly corresponds to the scale position of this reference temperature. For example, if the minimum temperature is near 0° C., the thermocouple measuring junction is placed in a bath of melting ice and an adjustment is made to exactly 0° C. scale position. Next a signal corresponding to the full scale temperature is applied at terminals 3, 3' and the calibration of voltage source 20 is varied until the position of the potentiometer arm 7 corresponds to a full scale deflection. Once these initial adjustments have been made, a plug-in unit for any other desired thermocouple type and temperature range may be quickly inserted and no further adjustment or calibration is required.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a potentiometer balancing circuit, the combination comprising: means for developing an input indicating voltage; a balancing potentiometer including a moveable arm for picking off a measuring voltage; an attenuator for dividing said measuring voltage comprising first, second and third resistances in series, said second resistance being of a value which renders the range of the fraction of the measuring voltage appearing across said second and third resistances equal to the range of said input voltage; means for comparing said input voltage and said fractional measuring voltage; and means for detecting the voltage across said third resistance as a signal indicating the unbalance between said compared voltages, said first resistance being large in comparison to the sum of said first and second resistances so that said first resistance determines the potentiometer arm current through said attenuator and the maximum unbalance voltage across said third resistance is substantially independent of the value of said second resistance.

2. The combination of claim 1 wherein said comparing means includes means for periodically connecting said input voltage to the junction between said first and second resistances, and the unbalance signal detected across said third resistance is at the frequency of said periodic connecting means.

3. The combination of claim 1 further including: servo means responsive to the unbalance signal across said third resistance for moving said potentiometer arm to a position at which no unbalance signal is detected; and a damping circuit connected in parallel with said first resistance to prevent hunting of said servo means, said damping circuit comprising a capacitor in series with a variable damping adjustment resistance, said first resistance being physically separate from said variable resistance.

4. In a thermocouple measuring circuit, the combination comprising: thermocouple means including a reference junction and a measuring junction for developing a voltage responsive to the difference in temperature between said junctions; means for developing a compensating voltage at a junction between two branches of a voltage-dividing resistance network, one of said branches containing a variable temperature-insensitive resistance and the other of said branches containing both a fixed temperature-sensitive resistance and a variable temperature-insensitive resistance; means for summing said thermocouple voltage and said compensating voltage to provide a temperature responsive input voltage which is simultaneously adapted to be insensitive to changes in the temperature of the reference junction of a given thermocouple type and to be at a preselected value for a preselected measuring temperature, by changing the value of said temperature-insensitive resistances only; a potentiometer including a moveable arm; an attenuator circuit in series with said potentiometer arm including a current limiting resistance, a range resistance and an output resistance, said range resistance being of a value which renders the range of the potentiometer measuring voltage appearing across the series combination of said range and output resistances equal to the range of said temperature responsive input voltage; means for comparing said input voltage and said measuring voltage; and means for detecting the voltage across said output resistance as a signal indicating the unbalance between said compared voltages whereby the maximum unbalance signal is substantially independent of the measuring range.

5. The combination of claim 4 wherein the temperature-insensitive resistances in said voltage-dividing network and the range resistance in said attenuator circuit comprise a plurality of resistors included in a plug-in unit, different plug-in units being used for different thermocouple types and temperature measuring ranges.

6. In combination: a voltage measuring instrument including a balancing potentiometer with a moveable measuring scale arm; thermocouple means including a reference junction and a measuring junction for developing a voltage responsive to the difference between said junctions; a calibrated stable voltage source providing the voltage across said potentiometer; a voltage-dividing resistance network connected across said stable voltage source, one branch of said network containing a variable temperature-insensitive resistance, and another branch of said network containing both a fixed temperature-sensitive resistance and a variable temperature-insensitive resistance; means for developing a compensating voltage at the junction between said branches; means for summing said thermocouple voltage and said compensating voltage to provide a temperature responsive input voltage which is simultaneously adapted to be insensitive to changes in the temperature of the reference junction of a given thermocouple type and to be equal to the minimum scale arm voltage when the measured temperature is at the minimum of the input temperature range, by changing the value of said temperature-insensitive resistance only; an attenuator circuit in series with said potentiometer arm including a current limiting resistance, a range resistance and an output resistance, said range resistance being of a value which renders the range of the potentiometer measuring voltage appearing across the series combination of said range and output resistances equal to the range of said temperature responsive input voltage, and said output resistance comprising a pair of resistances connected in series across said calibrated voltage source, the junction between said pair of resistances being connected to said range resistance, the open circuit voltage at said last-named junction being equal to said minimum scale arm voltage; means for comparing said input voltage and said measuring voltage; and means for detecting the voltage across said output resistance as a signal indicating the unbalance between said compared voltages whereby the minimum temperature input voltage is balanced when the potentiometer arm is at the minimum scale position and the maximum unbalance signal is substantially independent of the measuring range.

7. The combination of claim 6 further including a standardizing resistance across said stable voltage source so that the current through the internal impedance of said source remains constant with changes in the temperature-insensitive resistances of said voltage-dividing network.

8. The combination of claim 7 further including a pair of differentially variable scale positioning resistances in series with said potentiometer.

9. The combination of claim 8 wherein the temperature-insensitive resistances of said voltage-dividing network, the range resistance in said attenuator circuit, and said current standardizing resistance comprise a plurality of resistors in a plug-in unit, different plug-in units being used for different thermocouple types and temperature measuring ranges.

10. The combination of claim 9 wherein said voltage measuring instrument is a graphic recorder including a recording stylus; and further comprising servo means responsive to said unbalance signal for moving said potentiometer arm to a position at which no unbalance signal is detected, said potentiometer arm being mechanically coupled to said recording stylus.

11. In a temperature sensing circuit, the combination comprising: thermocouple means including a reference junction and a measuring junction for developing a voltage responsive to the difference in temperature between said junctions; a voltage-dividing impedance network comprising a first branch including a variable temperature-insensitive impedance, and a second branch including both a variable temperature-insensitive impedance and a fixed temperature-sensitive impedance; means for developing a compensating voltage at the junction of said first and second branches; and means for combining said thermocouple voltage and said compensating voltage to produce an output which may be simultaneously adapted to compensate for the reference junction temperature variation of a given thermocouple type and to produce a given temperature reference voltage, by changing the values of said temperature-insensitive impedances only.

12. The combination of claim 11 wherein said temperature-insensitive impedances are including in a plug-in unit, different plug-in units being used for different thermocouple types and measuring temperatures.

References Cited in the file of this patent

UNITED STATES PATENTS

| | | |
|---|---|---|
| 1,643,668 | Lindblad | Sept. 22, 1927 |
| 2,250,712 | Johnson | July 29, 1941 |
| 2,277,365 | Michael | Mar. 24, 1942 |
| 2,367,746 | Williams | Jan. 23, 1945 |
| 2,773,414 | Green | Dec. 11, 1956 |
| 2,793,813 | Belcher | May 28, 1957 |

OTHER REFERENCES

Borden and Behar: "Bridges and Their Applications," Instruments, November 1934, pp. 229–244, vol. 7, 324/62.